US008901783B2

(12) United States Patent
Gregory et al.

(10) Patent No.: US 8,901,783 B2
(45) Date of Patent: Dec. 2, 2014

(54) HANDHELD DEVICE FORCE INDUCTION

(75) Inventors: Sherman A. Gregory, San Diego, CA (US); Martin H. Renschler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 12/862,482

(22) Filed: Aug. 24, 2010

(65) Prior Publication Data
US 2012/0049659 A1 Mar. 1, 2012

(51) Int. Cl.
*H02K 33/02* (2006.01)
*A63F 13/20* (2014.01)
*G06F 3/01* (2006.01)
*H02K 33/00* (2006.01)
*H02K 33/16* (2006.01)
*H02K 35/02* (2006.01)

(52) U.S. Cl.
CPC ............... *A63F 13/06* (2013.01); *H02K 33/16* (2013.01); *A63F 2300/1043* (2013.01); *G06F 3/016* (2013.01); *H02K 35/02* (2013.01); *A63F 2300/1037* (2013.01); *H02K 33/00* (2013.01)
USPC ............... 310/12.01; 310/14; 310/17; 310/15

(58) Field of Classification Search
USPC ............. 310/12, 14, 17, 19, 15, 12.01, 12.06, 310/12.22, 12.27, 12.24, 339, 338, 311, 310/319; 318/135, 119, 115, 686; 345/156–173
IPC ........................................................ H02N 2/00
See application file for complete search history.

(56) References Cited

U.S. PATENT DOCUMENTS

| 5,136,194 | A  | * | 8/1992 | Oudet et al. ...................... 310/15 |
| 6,236,125 | B1 | * | 5/2001 | Oudet et al. ............... 310/12.26 |
| 7,528,561 | B2 | * | 5/2009 | Kawai et al. .................... 310/14 |
| 7,906,877 | B2 | * | 3/2011 | Okada et al. .................... 310/15 |
| 7,969,069 | B2 | * | 6/2011 | Pellegrini ...................... 310/339 |
| 8,205,497 | B1 |   | 6/2012 | Okandan et al. |

(Continued)

FOREIGN PATENT DOCUMENTS

| JP | H06113522 A | 4/1994 |
| JP | 2000262032 A | 9/2000 |

(Continued)

OTHER PUBLICATIONS

International Search Report and Written Opinion—PCT/US2011/048990—ISA/EPO—Nov. 15, 2011.

*Primary Examiner* — Thomas Dougherty
*Assistant Examiner* — Karen B Addison
(74) *Attorney, Agent, or Firm* — Jeffrey D. Jacobs

(57) ABSTRACT

Techniques for providing directional force induction in a handheld device for use in, e.g., personal navigation applications. In an exemplary embodiment, a magnetic element is provided on a mechanical support fixedly attached to a chassis of the handheld device. One or more conducting coils surround the support. Current is generated in the one or more conducting coils to accelerate the magnetic element relative to the support, causing a tactilely perceptible force to a user of the handheld device due to the recoil of the chassis from the movement of the magnetic element. In an exemplary embodiment, passive movement of the magnetic element due to, e.g., physical jostling of the handheld device, may be used to deliver energy back to the system for energy harvesting.

20 Claims, 13 Drawing Sheets

(56) References Cited

U.S. PATENT DOCUMENTS

| | | |
|---|---|---|
| 2006/0290662 A1* | 12/2006 | Houston et al. .............. 345/156 |
| 2007/0282564 A1 | 12/2007 | Sprague et al. |
| 2008/0001484 A1 | 1/2008 | Fuller et al. |
| 2008/0174787 A1* | 7/2008 | Teo et al. .................... 356/614 |
| 2008/0246352 A1* | 10/2008 | Iwasa et al. .................. 310/14 |
| 2011/0111849 A1 | 5/2011 | Sprague et al. |
| 2011/0121953 A1 | 5/2011 | Grant et al. |
| 2012/0052951 A1 | 3/2012 | Gregory et al. |

FOREIGN PATENT DOCUMENTS

| | | |
|---|---|---|
| JP | 2004079639 A | 3/2004 |
| JP | 2008180652 A | 8/2008 |
| JP | 2008546534 A | 12/2008 |
| JP | 2009240126 A | 10/2009 |
| JP | 2010068690 A | 3/2010 |
| WO | WO-2007002775 A2 | 1/2007 |

* cited by examiner

HANDHELD DEVICE FORCE INDUCTION

TECHNICAL FIELD

The disclosure relates to force induction, and more particularly, to force induction in handheld devices.

BACKGROUND

Handheld devices such as personal digital assistants and cellular phones are popular in the consumer electronics market today, combining ease of portability with rich feature sets afforded by ever-increasing hardware and software capabilities. To provide a multi-media experience to users, such handheld devices may deliver audio, video, as well as tactile sensation. Tactile sensation may include vibration, torque, directional impulse, and/or any other force that is perceptible by touch to the user. While techniques for generating tactile sensation are known in the art, such techniques are not necessarily suitable for integration in a handheld device, which specifically calls for low weight and low power consumption. Furthermore, prior art techniques may not offer the capability for fine adjustment of the tactile sensation perceived by the user.

It would be desirable to provide novel power-efficient techniques for generating tactile sensation such as directional impulse in a low-weight and low-power handheld device.

SUMMARY

An aspect of the present disclosure provides an apparatus comprising: a chassis; a fixed support coupled to the chassis, the support having a first axis; a magnetic element movable relative to the support along the first axis; at least one conducting coil surrounding the first axis; and a current control block configured to generate current through the at least one conducting coil according to a current profile, the current profile designed to move the magnetic element along the first axis such that, over at least one cycle, the maximum acceleration of the magnetic element in one direction along the first axis is greater than the maximum acceleration of the magnetic element in the other direction along the first axis.

Another aspect of the present disclosure provides an apparatus comprising: a chassis; a fixed support coupled to the chassis, the support having a first axis; a magnetic element movable relative to the support along the first axis; at least one conducting coil surrounding the first axis; a re-chargeable energy source; a current control block configured to generate current through the at least one conducting coil, the current control block further configured to harvest energy from a current present in the at least one coil and to charge the re-chargeable energy source using the harvested energy; and a switching element selectively coupling the at least one coil to the active current generation block and the passive energy harvesting block.

Yet another aspect of the present disclosure provides a method comprising: generating a current in at least one coil surrounding a fixed support, the support coupled to a magnetic element movable along a first axis of the support, the current causing the magnetic element to move along the first axis such that, over at least one cycle, the maximum acceleration of the magnetic element in one direction along the first axis is greater than the maximum acceleration of the magnetic element in the other direction along the first axis.

Yet another aspect of the present disclosure provides a method comprising: during an active interval, generating a current in at least one coil surrounding a fixed support, the support coupled to a magnetic element movable along a first axis of the support, the current causing the magnetic element to move along the first axis; during a passive interval, harvesting energy from the at least one coil and storing the harvested energy in a re-chargeable energy source.

Yet another aspect of the present disclosure provides an apparatus comprising: a chassis; a fixed support coupled to the chassis, the support having a first axis; a magnetic element movable relative to the support along the first axis; at least one conducting coil surrounding the first axis; and means for generating a current in the at least one coil to generate a directional impulse along the first axis.

Yet another aspect of the present disclosure provides an apparatus comprising: a chassis; a fixed support coupled to the chassis, the support having a first axis; a magnetic element movable relative to the support along the first axis; at least one conducting coil surrounding the first axis; means for harvesting energy from a current present in the at least one coil; and means for storing the harvested energy.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are either omitted or shown in block diagram form in order to avoid obscuring the novelty of the exemplary embodiments presented herein.

Figure 1:
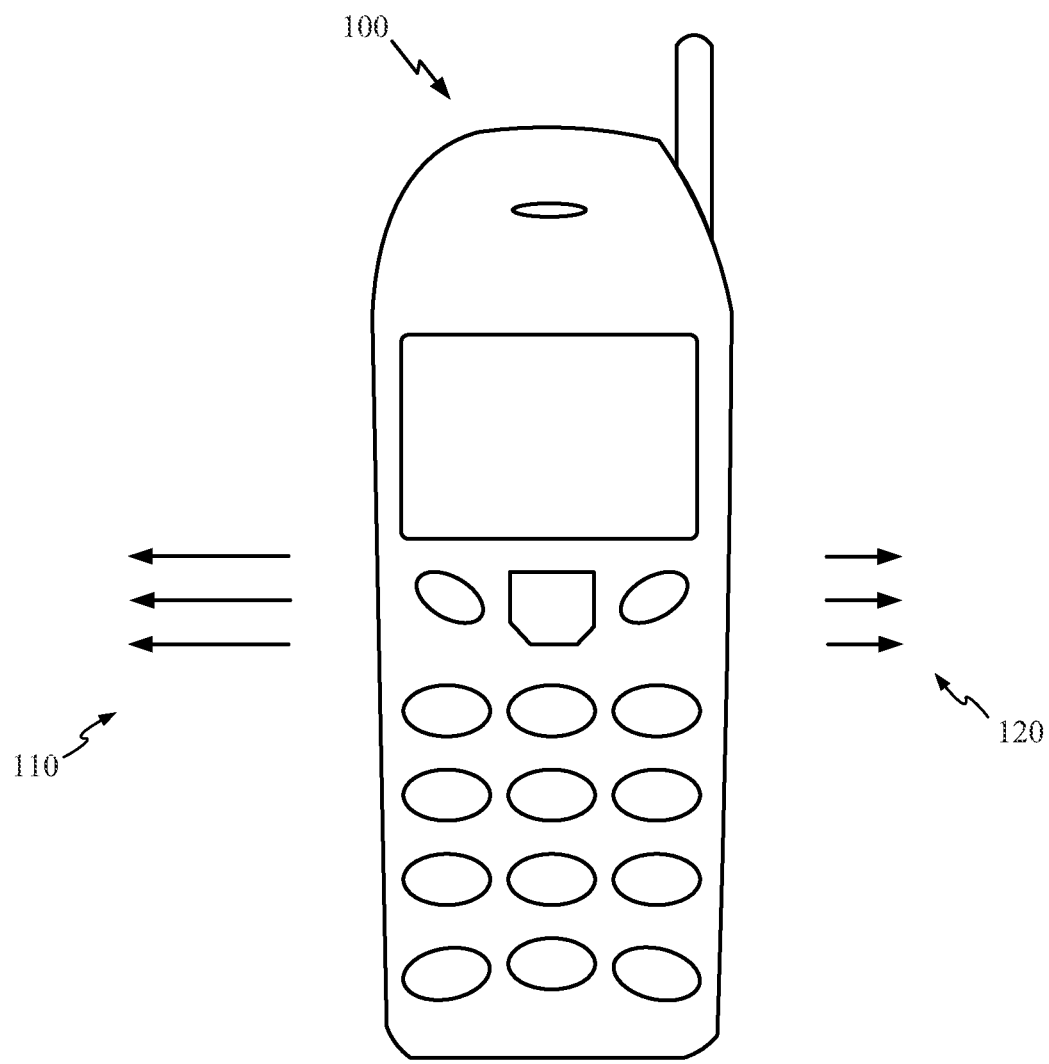
FIG. 1 illustrates an exemplary embodiment of a handheld device incorporating force induction techniques of the present disclosure.

FIG. 1 illustrates an exemplary embodiment of a handheld device 100 incorporating force induction techniques of the present disclosure. In FIG. 1, the handheld device 100 is shown as a mobile phone. One of ordinary skill in the art will appreciate that a handheld device of the present disclosure need not be a mobile phone, and may generally be any type of handheld device, e.g., a personal digital assistant (PDA), a personal navigation device, smart phone, etc. Such alternative exemplary embodiments are contemplated to be within the scope of the present disclosure.

According to the present disclosure, the handheld device 100 is configurable to generate a force impulse that is tactilely perceptible to a user (not shown in FIG. 1) of the handheld device 100. Such physical impulses may be useful when other visual or audible indications are less effective due to, e.g., physical restrictions of the environment, or physical impairments of the user. In FIG. 1, the handheld device 100 may generate, e.g., one or more sharp physical impulses 110, or "knocks," to the left side of the handheld device 100 that are tactilely perceptible to a user. Similarly, the handheld device may generate similar knocks 120 to the right side of the handheld device 100. In an exemplary embodiment, a left knock 110 may signal the left direction to the user of the handheld device 100, while a right knock 120 may signal the direction to the right. In alternative exemplary embodiments, it will be appreciated that directional impulses to the right, top, bottom, front, back, or any local portion of the handheld device 100 may be similarly generated and felt by the user.

Figure 1A:
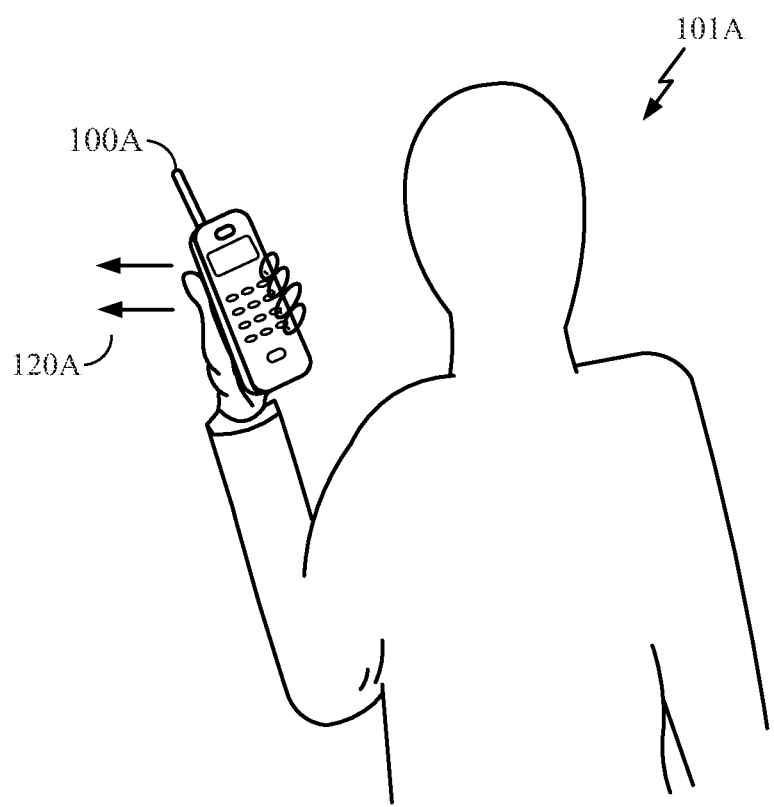
FIG. 1A illustrates an exemplary embodiment of the present disclosure in a handheld personal navigational device according to the present disclosure.

FIG. 1A illustrates an exemplary embodiment of the present disclosure in a handheld personal navigational device 100A according to the present disclosure. Note FIG. 1A is shown for illustrative purposes only, and is not meant to limit the scope of the present disclosure to navigational devices. In FIG. 1A, the device 100A is configured as a personal navigational device that determines a target location specified by the user 101A relative to a present location of the user 101A. It will be appreciated that the determination of present and target locations by a navigational device is known in the art, and may utilize, e.g., satellite signals from the global positioning system (GPS). To guide the user 101A to the target location, the device 100A may generate one or more knocks or directional impulses to a side of the device 100A, as illustrated by 120A in FIG. 1A. In the exemplary embodiment shown in FIG. 1A, the knocks 120A are generated to the left side of the device 100A to indicate that the user should proceed to the left to reach a target location.

Figure 2:
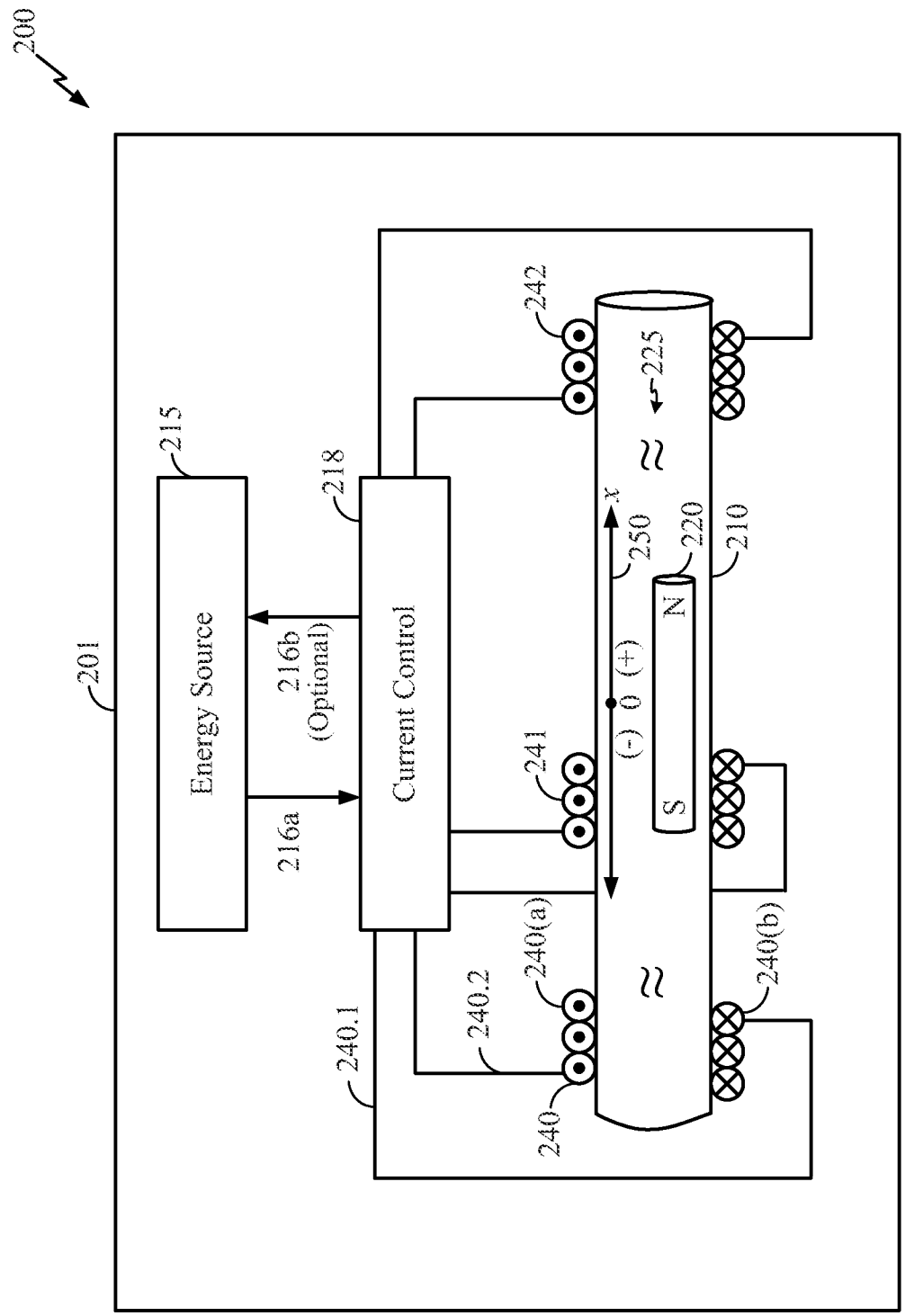
FIG. 2 illustrates an exemplary embodiment of a mechanism for generating tactilely perceptible physical impulses using force induction techniques according to the present disclosure.

FIG. 2 illustrates an exemplary embodiment 200 of a mechanism for generating tactilely perceptible physical impulses using force induction techniques according to the present disclosure. In FIG. 2, a chassis 201 is provided on which the components of the mechanism 200 may be mounted. The chassis 201 may be, e.g., a physical chassis of a handheld device 100 as shown in FIG. 1. Alternatively, the chassis 201 may in turn be mounted on a separate chassis of the handheld device 100.

The chassis 201 is coupled to a fixed mechanical support 210, which is shown as a hollow tube in FIG. 2. The tube 210 is hollow along an ordinate axis 250 (also denoted herein as a "first axis"). A magnetic element 220 having a north pole (N) and a south pole (S) may be present inside the tube 210. In an exemplary embodiment, the inside of the tube 210 may include a vacuum, and the magnetic element 220 may be constrained to move along the axis 250. In FIG. 2, the variable x may describe the net lateral displacement of the center of the magnetic element 220 relative to a center of the tube 210 along the axis 250, with the center of the tube 210 corresponding to x=0. One of ordinary skill in the art will appreciate that the ordinate axis 250 is shown for descriptive purposes only, and is not meant to limit the scope of the present disclosure. For example, in alternative exemplary embodiments, the center of the ordinate axis may reference any arbitrary point on the tube 210.

In an exemplary embodiment, the interior of the tube 210 may be lined with a low-friction material, e.g., PTFE or "Teflon," or lined with a lubricant. Wound around the tube 210 are one or more sets of electrically conducting wound coils, three coils 240, 241, 242 of which are shown in cross-section in FIG. 2. Description of the first coil 240 is given hereinbelow; it will be appreciated that similar description may apply to coils 241, 242, and any other number of coils in alternative exemplary embodiments.

The first coil 240 is wound at least once, and preferably many times, around the tube 210. First 240.1 and second 240.2 ends of the first coil 240 are coupled to a current control block 218. Current flow is shown in FIG. 2 with 240($a$) representing current flow into the plane of the cross section, and 240($b$) representing current flow out of the plane of the cross section. Block 218 controls the current flowing through the first coil 240. Coils 241 and 242 similarly have ends coupled to block 218, and may support current generated by block 218. Block 218 is in turn coupled to an energy source 215. The energy source 215 may supply the energy to generate current through any of the coils 240, 241, 242 through the current control block 218. In certain exemplary embodiments, the energy source 215 may also store energy generated from the coils 240, 241, 242, e.g., as further described with reference to FIG. 5 hereinbelow.

Figure 3A:
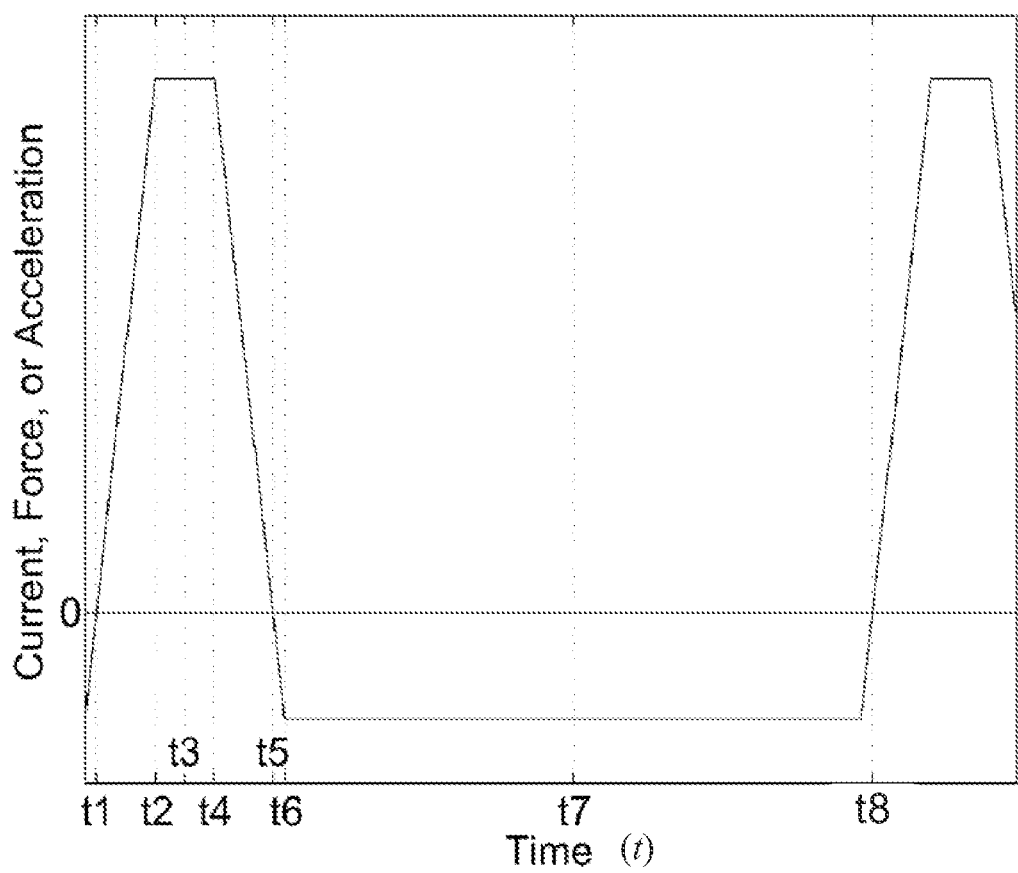
FIGS. 3A, 3B, and 3C illustrate exemplary current, displacement, and velocity profiles for the mechanism of FIG. 2.
Figure 3B:
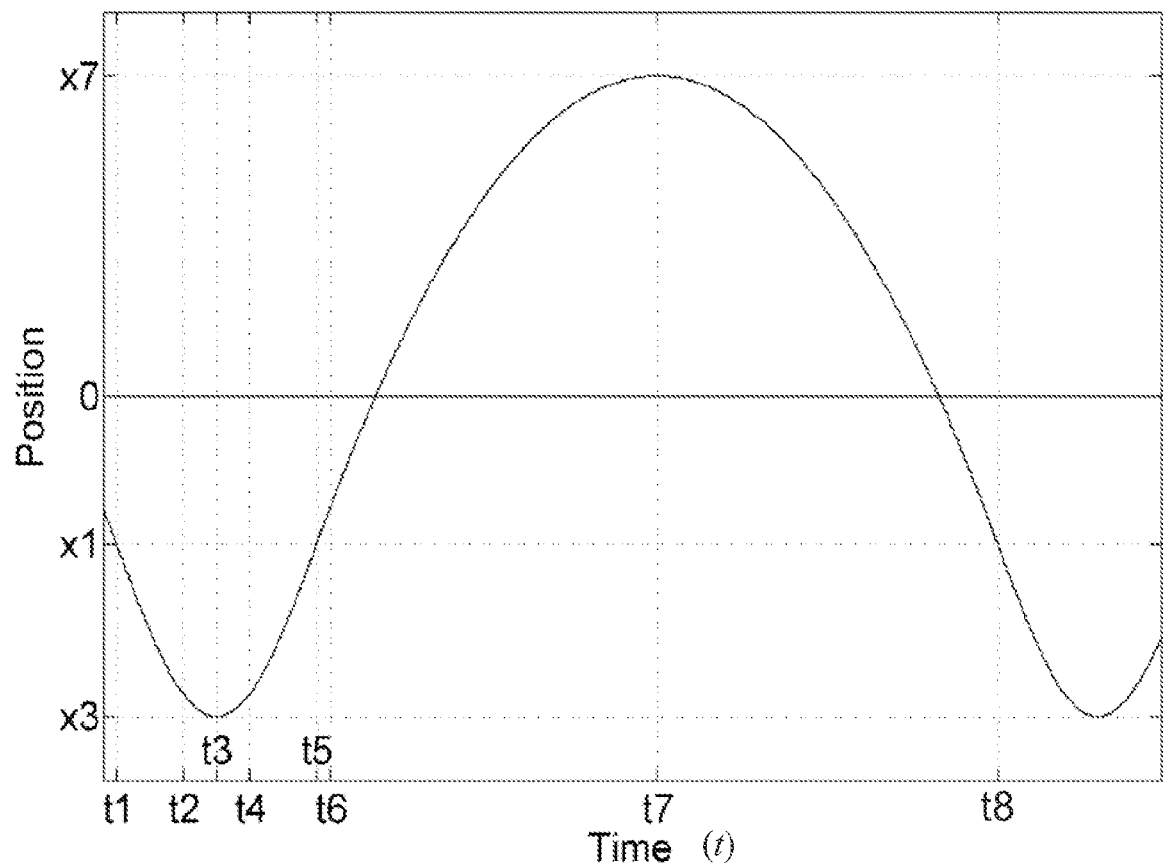
Figure 3C:
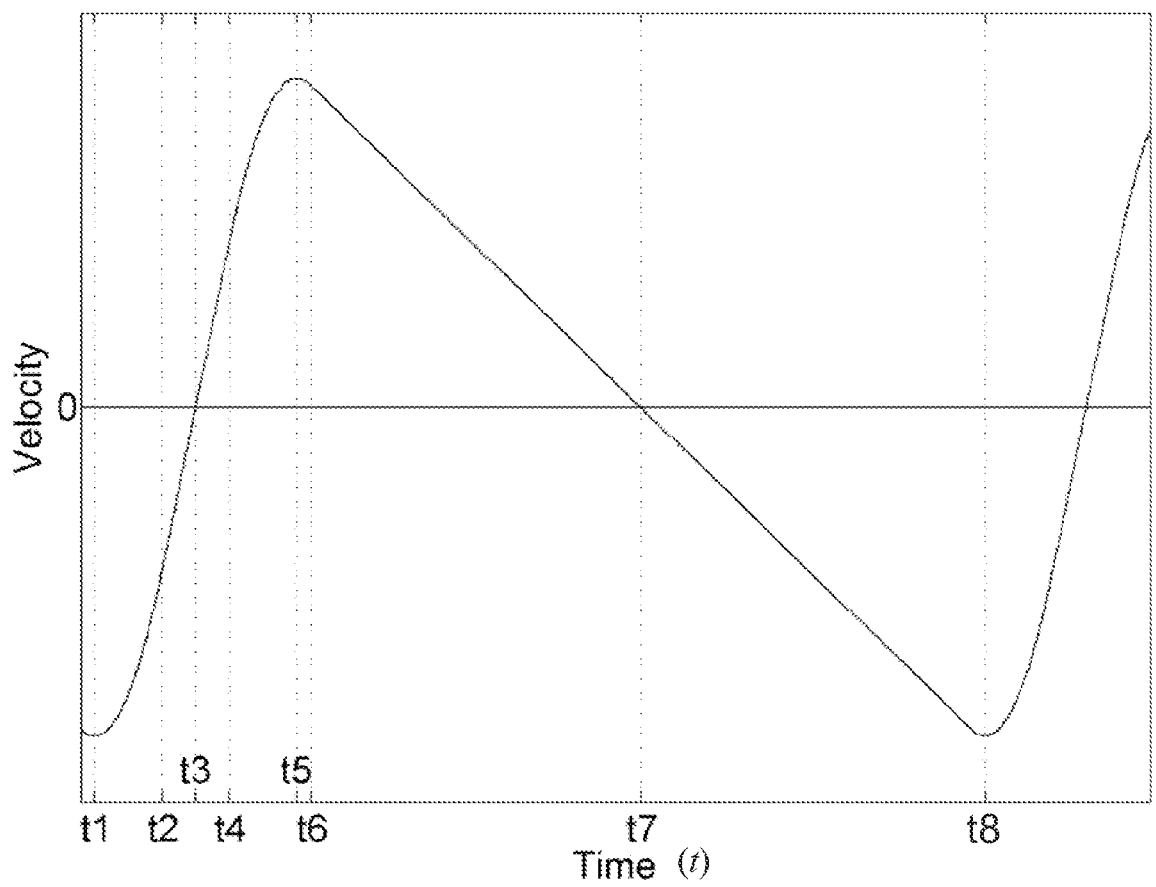

FIGS. 3A, 3B, and 3C illustrate exemplary current, displacement, and velocity profiles, respectively, for the mechanism 200 of FIG. 2. In particular, FIG. 3A illustrates a plot of current through one or more of the coils 240, 241, 242 versus time (t), showing the progression of time from left to right along the horizontal axis. It will be appreciated that as current, force, and acceleration are expected to be proportional to one another, they are shown on a single vertical axis for simplicity. In FIGS. 3B and 3C, the displacement and velocity, respectively, of the magnetic element 220 are plotted versus time (t), assuming the corresponding current is as shown in FIG. 3A. It will be appreciated that FIGS. 3A, 3B, and 3C are shown for illustrative purposes only, and are not meant to limit the scope of the present disclosure to any particular current, displacement or velocity profiles shown.

Arbitrarily fixing t=t1 as corresponding to an "initial" time, it can be seen from FIG. 3B that the magnetic element 220 is initially positioned at x=x1, which lies to the left of the center x=0 of the tube 210. Furthermore, FIG. 3C shows that the magnetic element 220 is initially moving with negative velocity (i.e., in the negative x direction, or to the left of the tube with reference to FIG. 2) at time t=t1.

Referring to the current profile in FIG. 3A, from time t=t1 to t=t5, a positive current is present in the coil, and may be generated by the current control block 218. It will be appreciated that a net current through the coil as exists between t=t1 and t=t5 will generate a magnetic field in the tube 210, which thereby generates a force and corresponding positive acceleration on the magnetic element 220. Consequently, the velocity of the magnetic element 220 is seen to increase in FIG. 3C, while the displacement of the magnetic element 220 is shown to change as shown in FIG. 3B. In particular, in FIG. 3B, the magnetic element 220 is seen to travel from x=x1 at t=t1 to a leftmost extreme of x=x3 at t=t3, whereupon the magnetic element 220 reverses direction and begins traveling in the positive x direction starting at t=t3, and continues to accelerate in the positive x direction until t=t5. During the time t=t1 to t=t5, the magnetic element 220 may be understood as accelerating in the positive x direction in response to the positive current in the coil.

From time t=t5 to t=t8, a current of opposite polariy is applied, e.g., as commanded by the current control block 218. This change in current will be accompanied by a corresponding change in the magnetic field present in the tube 210. Responsive thereto, the magnetic element 220 is seen to experience negative acceleration in FIG. 3C from t=t5 to t=t8, while continuing to move right from x=x1, to a rightmost extreme of x=x7 at t=t7 in FIG. 3B. At t=t7, the magnetic element 220 reverses direction and begins traveling in the negative x direction due to the continued force being applied in the negative x direction. From t=t7 to t=t8, the magnetic element continues moving in the negative x direction until it once again returns to x=x1 at t=t8.

In the exemplary embodiment shown, the magnitude of the negative acceleration from t=t6 to t=t8 is less than the magnitude of acceleration from t=t2 to t=t4, thereby causing the user to feel a net directional impulse in the positive x direction. In general, it will be appreciated that such a directional impulse will be produced if the maximum acceleration of the magnetic element in one direction is greater than the maximum acceleration of the magnetic element in the other direction. Furthermore, it will be appreciated that the waveform from t=t1 to t=t8 in FIG. 3A may be considered to form a single cycle, and may be repeated over multiple cycles to produce a periodic series of directional impulses if desired.

While an exemplary current profile for only one of the coils 240, 241, and 242 is shown in FIG. 3A, one of ordinary skill in the art will appreciate that a composite current profile may be generated by simultaneously controlling independent current profiles of all of the coils 240, 241, and 242 for the mechanism 200. For example, multiple coils may be distributed along the axis of the tube 210 as shown in FIG. 2A, and independently switched in sequence to allow finer control of the displacement profile of the magnetic element 220 over the axis of the tube 210. It will be further appreciated that in alternative exemplary embodiments, fewer or more than the three coils shown in FIG. 2 may readily be accommodated. Such alternative exemplary embodiments are contemplated to be within the scope of the present disclosure.

From FIGS. 3A, 3B, and 3C, it will be appreciated that by actively controlling the current profile over a specific time interval, the displacement profile of the magnetic element 220 may be correspondingly controlled over such time interval. Conversely, changes in the displacement of the magnetic element 220 not due to active current control (e.g., movement of the magnetic element 220 due to user movement, jostling, etc.) may induce currents in the coil or coils according to Faraday's law of induction. In an exemplary embodiment, current in the coil(s) generated by movement of the magnetic element 220 due to such other physical forces may be harvested for energy, as further described hereinbelow.

Figure 4A:
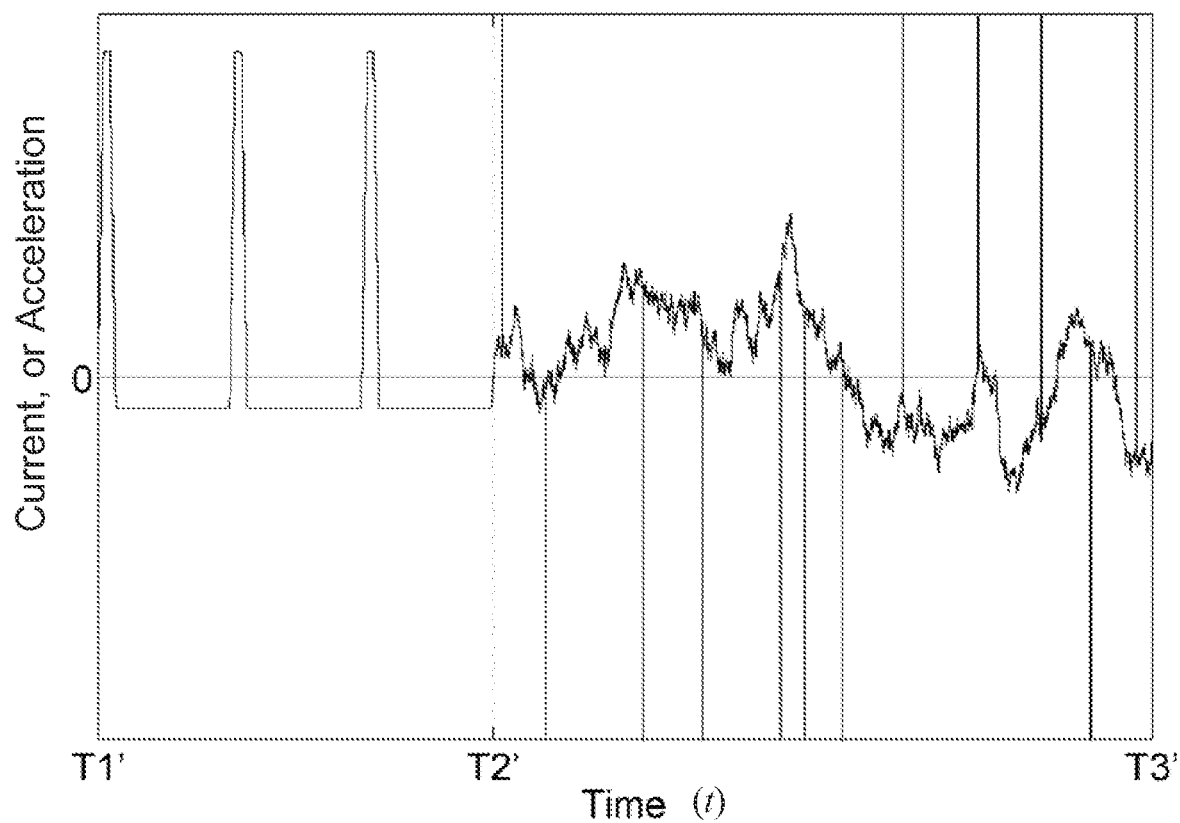
FIGS. 4A, 4B, and 4C illustrate alternative exemplary current, displacement, and velocity profiles for the mechanism of FIG. 2.
Figure 4B:
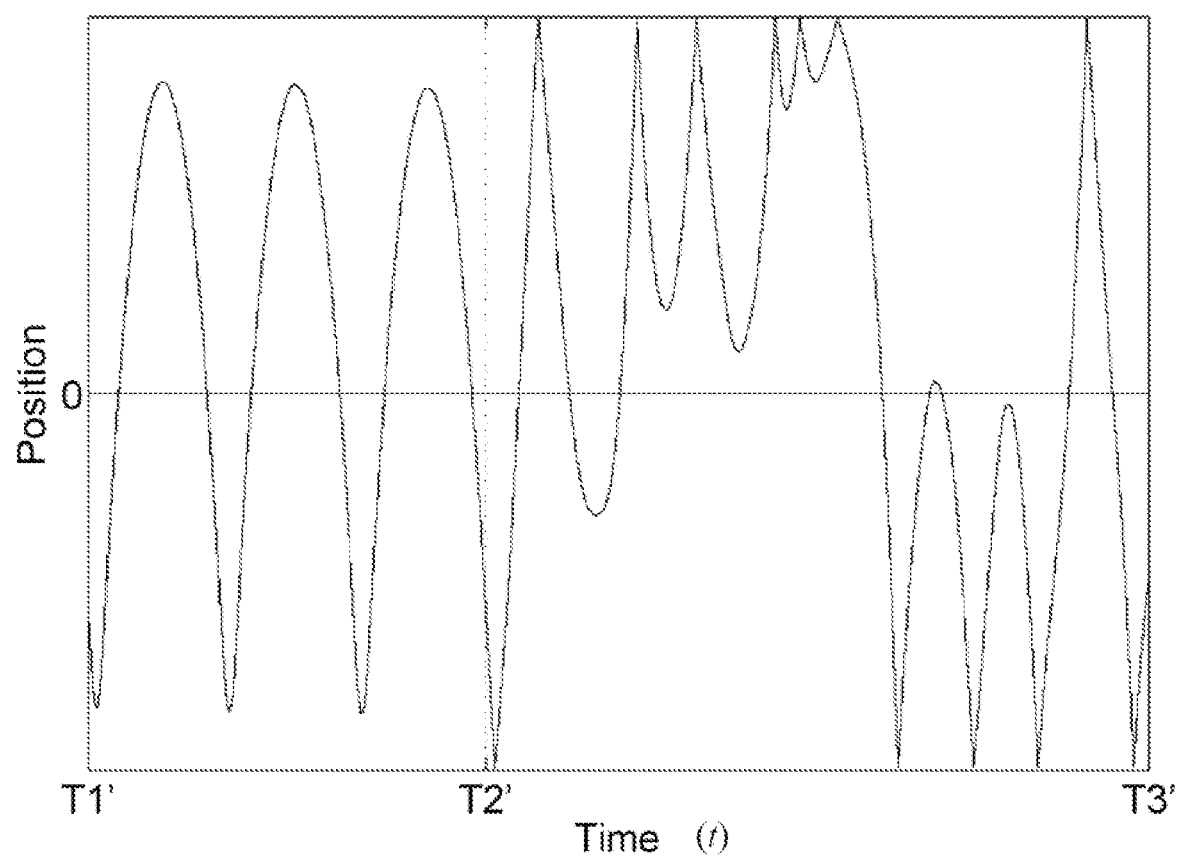
Figure 4C:
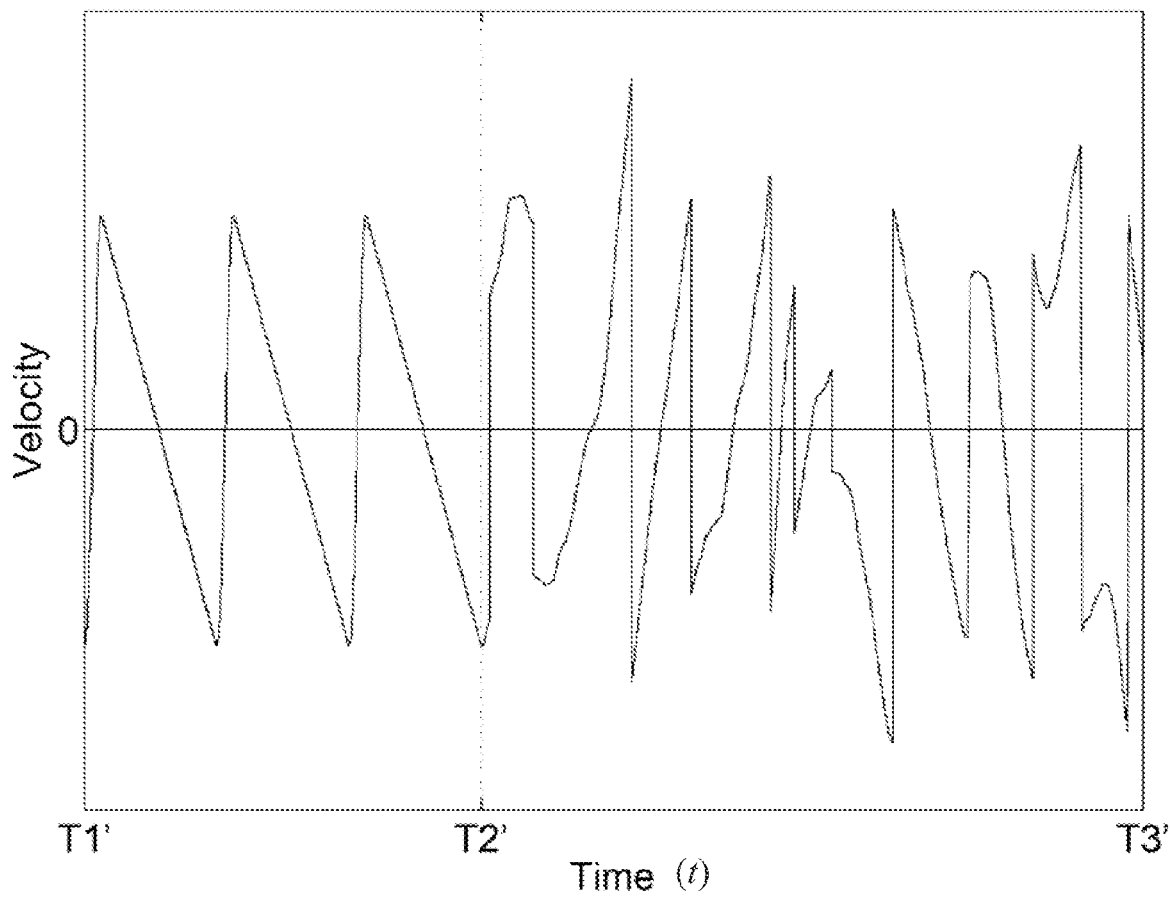

FIGS. 4A, 4B, and 4C illustrate alternative exemplary current, displacement, and velocity profiles for the mechanism 200 of FIG. 2. Again, it will be appreciated that FIGS. 4A, 4B, and 4C are shown for illustrative purposes only, and are not meant to limit the scope of the present disclosure to any particular current and/or displacement profiles shown.

In FIGS. 4A, 4B and 4C, from time t=T1' to t=T2', current through the coil shown is actively controlled by the current control block 218, and current generated by the magnetic element 220 due to other forces is assumed to be negligible. This time interval is also denoted as an "active" interval. During the active interval, variations in the displacement profile of the magnetic element 220 as shown in FIG. 4B are largely caused by the active generation of current by the current control block 218.

From time t=T2' to t=T3', current through the coil shown is not actively controlled by the current control block 218, and other forces on the magnetic element 220 are assumed to cause the variations in coil current shown. This time interval is also denoted as a "passive" interval. During the passive interval, the current profile of the magnetic element 220 as shown in FIG. 4A is caused by variations in the displacement profile of the magnetic element 220 as shown in FIG. 4B.

In an exemplary embodiment, variations in the coil current during the passive interval may be harvested for energy using, e.g., a harvesting mechanism in the current control block 218 such as further described with reference to FIG. 5.

Figure 5:
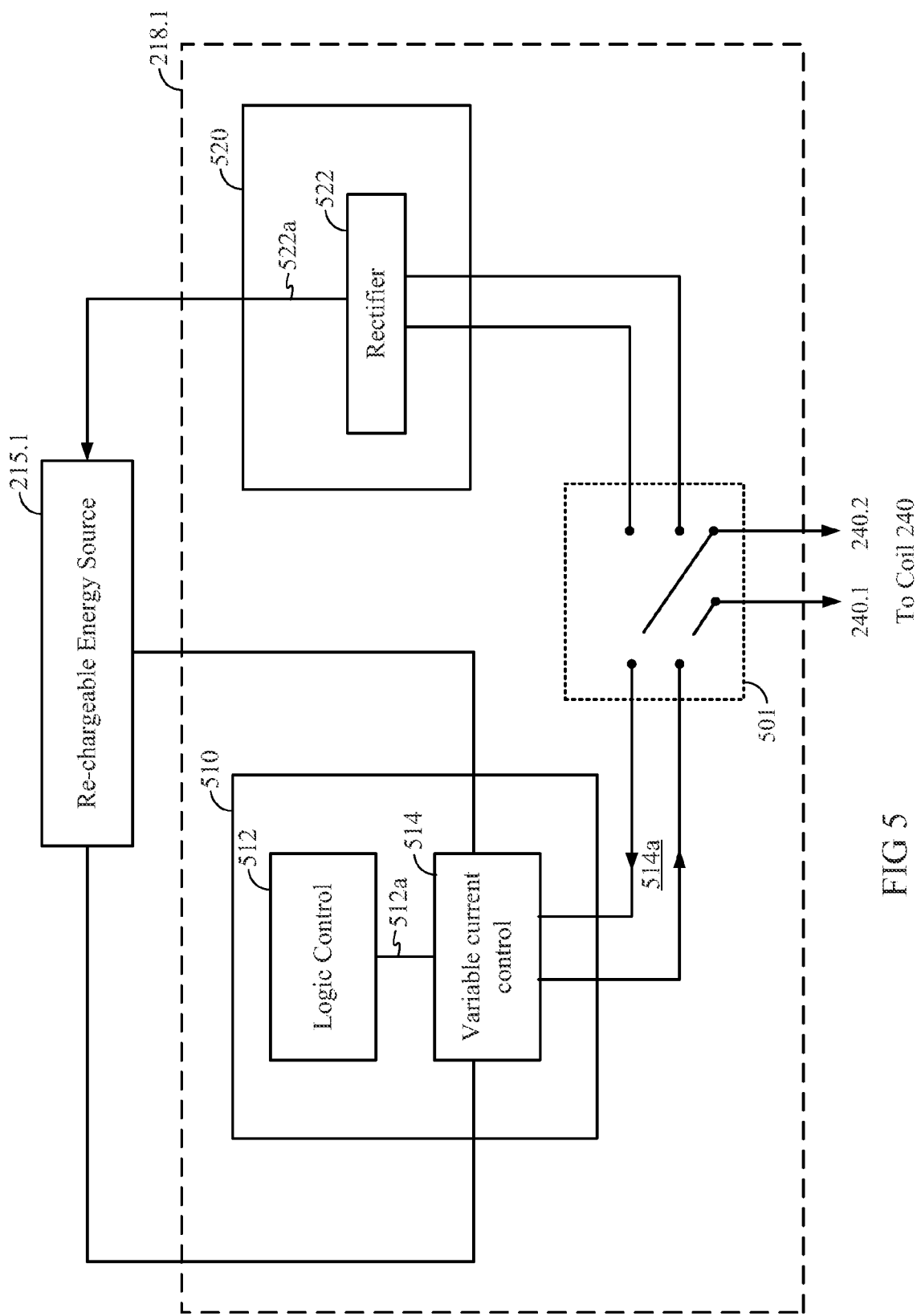
FIG. 5 illustrates exemplary embodiments of a current control block and energy source that can alternately generate a desired current profile during active intervals, as well as harvest energy from a current profile during passive intervals.

FIG. 5 illustrates exemplary embodiments of a current control block 218.1 and energy source 215.1 that can both generate a desired current profile during active intervals, as well as harvest energy from current during passive intervals.

In FIG. 5, the block 218.1 includes a dual-terminal switching element 501 that selectively couples the ends 240.1 and 240.2 of a coil 240 to either an active current generation block 510 during active intervals, or to a harvesting circuit 520 during passive intervals. It will be appreciated that the harvesting circuit 520 may be configured to harvest electrical energy from the kinetic energy of the magnetic element 220 during passive intervals, and charge the re-chargeable energy source 215.1 with the harvested electrical energy. While the switching element 501 is shown as switching only ends 240.1 and 240.2 for the first coil 240, it will be appreciated that a switching element may also readily accommodate additional coils 241, 242, as well as other coils not explicitly shown, according to the present disclosure.

It will be appreciated that the symbol denoting the switching element 501 in FIG. 5 is used only to illustrate the function of the switching element 501, and is not meant to limit the scope of the present disclosure to any particular implementation of a switching element. One of ordinary skill in the art will appreciate that there are a variety of ways in which such a switching element may be implemented, e.g., mechanically, or electronically using transistors and/or other circuit elements, etc. Such exemplary embodiments are contemplated to be within the scope of the present disclosure.

The active current generation block 510 includes a logic control unit 512 for generating a digital representation 512a of a desired current profile for the coil 240 during active intervals. The digital representation 512a is coupled to a variable current control block 514, which may convert the digital representation 512a of the desired current to an analog current 514a, which is subsequently provided to the coil 240. During active intervals, power is drawn from the re-chargeable energy source 215.1 through circuitry controlled by the variable current control block 514 to drive the coil 240 with the analog current 514a.

In an exemplary embodiment, the variable current control block 514 may be implemented using, e.g., a pulse-width modulation circuit for generating a current whose short-term average value corresponds to the desired current. In alternative exemplary embodiments, the variable current control block 514 may also include, e.g., a digital-to-analog converter (DAC). One of ordinary skill in the art will appreciate that there are a plurality of techniques for generating an analog current according to a digitally specified profile, and such exemplary embodiments are contemplated to be within the scope of the present disclosure.

During passive intervals, the harvesting circuit 520 harvests electrical energy from the coil. In FIG. 5, the charging circuit is shown as including a rectifier 522 that rectifies current from the coil 240 to generate an output voltage. In an exemplary embodiment, the rectifier 522 may be a bi-directional rectifier known in the art capable of rectifying both positive and negative currents. The output voltage 522a may be used to charge the energy source 215.1. Thus during passive intervals, energy is supplied to the re-chargeable energy source 215.1. The energy source 215.1 may be any re-chargeable energy source known in the art, e.g., a re-chargeable battery, a capacitor, etc.

It will be appreciated that in alternative exemplary embodiments, the harvesting circuit 520 may be implemented using any structures known to one of ordinary skill in the art to perform the functions described. For example, the harvesting circuit 520 may alternatively include a voltage up-converter known in the art to generate an output voltage for the energy source 215.1. Such alternative exemplary embodiments are contemplated to be within the scope of the present disclosure.

It will further be appreciated that the re-chargeable energy source 215.1 may also be used to supply energy to modules of a handheld device 100 other than the mechanism 200 for generating directional force impulses. In an exemplary embodiment wherein the current control block 218.1 and re-chargeable energy source 215.1 are utilized in the force impulse generation mechanism 200, the mechanism 200 provides the benefits of both directional impulse generation as well as energy harvesting, which may advantageously extend the overall battery life of the handheld device 100.

Note FIG. 5 is shown for illustrative purposes only, and is not meant to limit the scope of the present disclosure to any particular implementations of the blocks shown. For example, in alternative exemplary embodiments, a mechanism 200 need not incorporate energy harvesting capabilities of the exemplary embodiment shown in FIG. 5. Such alternative exemplary embodiments are contemplated to be within the scope of the present disclosure.

Figure 6A:
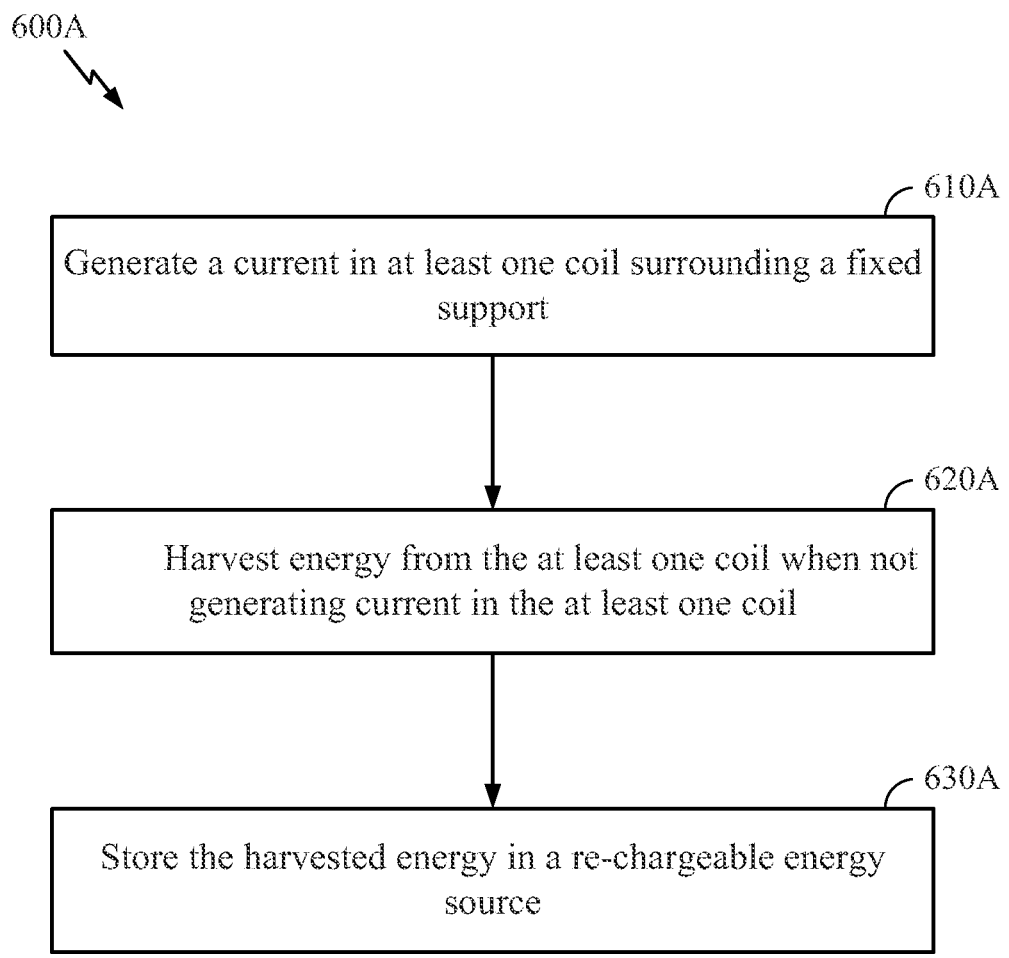
FIGS. 6A and 6B illustrate exemplary embodiment of methods for operating a mechanism incorporating the capabilities shown in FIG. 5.
Figure 6B:
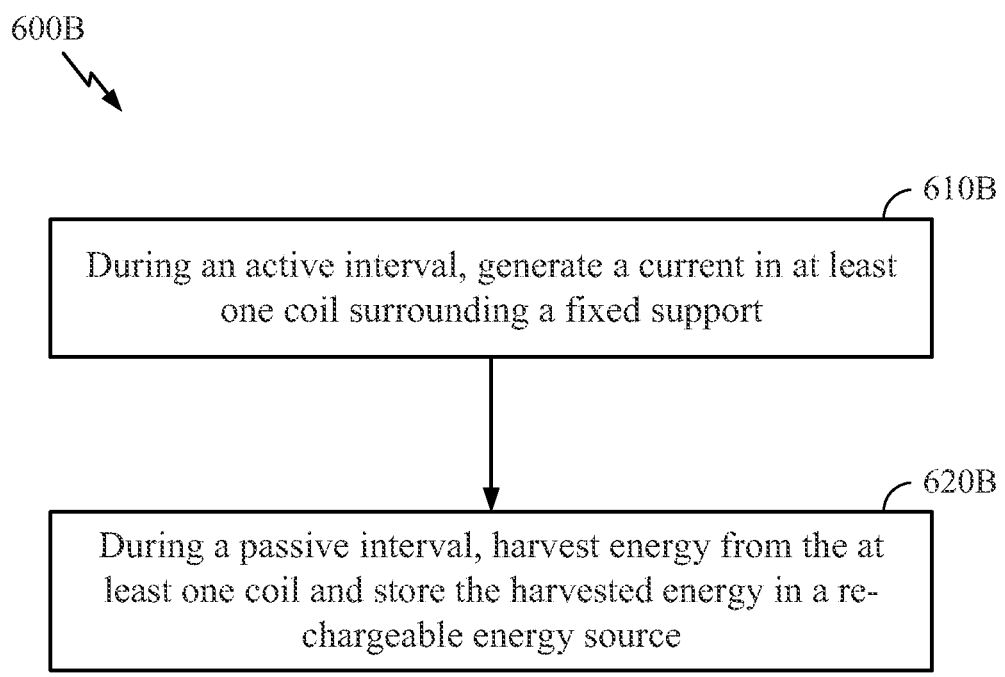

FIGS. 6A and 6B illustrate exemplary embodiments of methods according to the present disclosure.

In FIG. 6A, at block 610A, the method 600A includes generating a current in at least one coil surrounding a fixed support. In an exemplary embodiment, the support is coupled to a magnetic element movable along a first axis of the support. The current may cause the magnetic element to move along the first axis such that, over at least one cycle, the maximum acceleration of the magnetic element in one direction along the first axis is greater than the maximum acceleration of the magnetic element in the other direction along the first axis.

At block 620A, the method includes harvesting energy from the at least one coil when not generating current in the at least one coil.

At block 630A, the method includes storing the harvested energy in a re-chargeable energy source.

In FIG. 6B, at block 610B, the method 600B includes, during an active interval, generating a current in at least one coil surrounding a fixed support. In an exemplary embodiment, the support is coupled to a magnetic element movable along a first axis of the support, and the current causes the magnetic element to move along the first axis.

At block 620B, during a passive interval, the method includes harvesting energy from the at least one coil and storing the harvested energy in a re-chargeable energy source.

Figure 7:
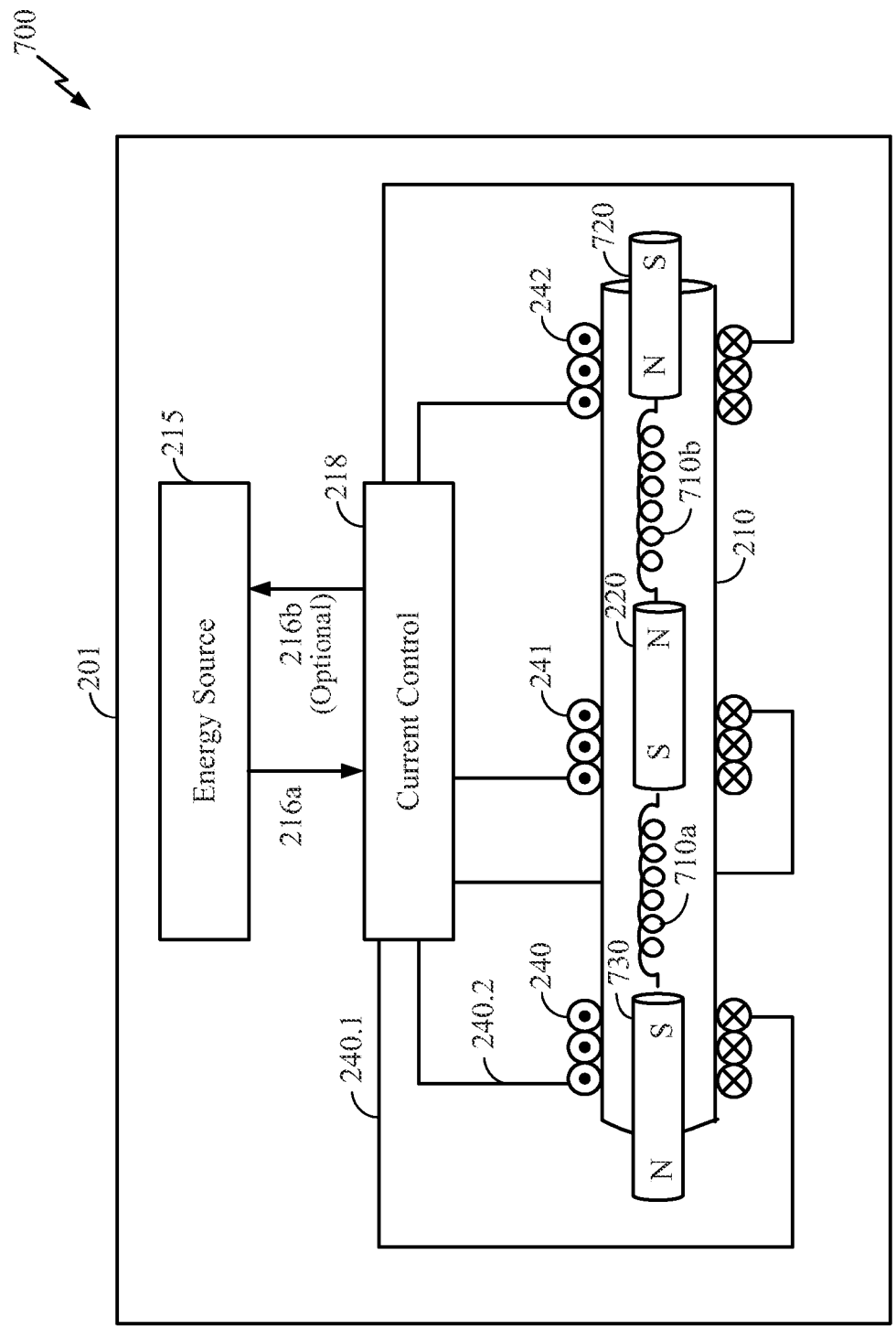
FIG. 7 illustrates an alternative exemplary embodiment of a mechanism for generating directional impulses according to the present disclosure.

FIG. 7 illustrates an alternative exemplary embodiment 700 of a mechanism for generating directional impulses according to the present disclosure. As shown in FIG. 7, one or more auxiliary magnets 720, 730 may be provided at the ends of the tube 210. For example, the auxiliary magnet 720 may be physically fixed at one end of the tube 210, and the auxiliary magnet 730 may be physically fixed at the other end. The polarity of the auxiliary magnet 720 may be chosen such that it repels the closer end of the magnetic element 220, and similarly for auxiliary magnet 730. For example, the north pole (N) of the auxiliary magnet 720 is oriented toward the north pole (N) of the magnetic element 220, while the south pole (S) of the auxiliary magnet 730 is oriented toward the south pole (S) of the magnetic element 220. In this manner, whenever the magnetic element 220 approaches the auxiliary magnet 720, a repulsive force will be generated between the magnets 220 and 720 that will push the magnetic element 220 back towards its initial position.

FIG. 7 further illustrates that one or more biasing springs 710a, 710b may be provided. One end of the biasing spring 710a is attached to the magnetic element 220, while another end is attached to one end of the tube, e.g., to one end of the magnet 730. Similarly, one end of the biasing spring 710b is attached to the magnetic element 220, while another end is attached to another end of the tube, e.g., to one end of the magnet 720. It will be appreciated that the biasing springs 710a, 710b may generate forces to pull and push the magnetic element 220 back to an initial position whenever it is displaced.

In an alternative exemplary embodiment, a single magnet may be provided at the center of the tube 210 to bias the magnetic element 220 towards the center. For example, a ring magnet may be wrapped around the circumference of the tube 210 near its center (e.g., x=0 according to FIG. 2). Such alternative exemplary embodiments are contemplated to be within the scope of the present disclosure.

By providing one or more biasing springs and/or one or more auxiliary magnets as described in FIG. 7, the mechanism 700 may require the current control block 218 to generate less current in the coils 240, 241, and 242 to bring the magnet back to its initial position, thus reducing power consumption and/or the complexity of the control method.

It will be appreciated that in certain exemplary embodiments, the one or more auxiliary magnets need not be employed in conjunction with the one or more biasing springs, and either feature can be incorporated independently of the others. In alternative exemplary embodiments, the magnetic element 220 may specifically incorporate a non-magnetic mass (not shown) to increase the total mass of the magnetic element 220, such that the directional force impulse generated may be more clearly felt by the user. For example, such non-magnetic mass may be a battery of the handheld device 100. In alternative exemplary embodiments, more than one magnetic element 220 may also be incorporated. Such alternative exemplary embodiments are contemplated to be within the scope of the present disclosure.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. An apparatus comprising:
    a chassis;
    a fixed support coupled to the chassis, the support having a first axis;
    a magnetic element movable relative to the support along the first axis;
    at least one conducting coil surrounding the first axis; and
    a current control block configured to generate current through the at least one conducting coil according to a current profile, the current profile designed to move the magnetic element along the first axis such that, over at least one cycle, the maximum acceleration of the magnetic element in one direction along the first axis is greater than the maximum acceleration of the magnetic element in the other direction along the first axis.

2. The apparatus of claim 1, further comprising a handheld device, the chassis forming a chassis of the handheld device.

3. The apparatus of claim 2, the handheld device comprising a mobile phone.

4. The apparatus of claim 2, the handheld device comprising a personal navigation device.

5. The apparatus of claim 1, the at least one conducting coil comprising a plurality of coils, the current control block configured to separately generate current profiles for each of the plurality of coils to move the magnetic element along the first axis.

6. The apparatus of claim 1, the current control block comprising an active current generation block comprising:
    a logic control unit for generating a magnitude and sign of a current desired to be present in the at least one coil; and
    a digital-to-analog converter for converting the output of the logic control unit to an analog current.

7. The apparatus of claim 1, the current control block comprising:
    an active current generation block for generating the current profile;
    a passive energy harvesting block for harvesting energy from a current present in the at least one coil to charge a re-chargeable energy source; and
    a switching element selectively coupling the at least one coil to the active current generation block and the passive energy harvesting block.

8. The apparatus of claim 1, further comprising at least one spring, a first end of the at least one spring fixedly coupled to the fixed support, a second end of the spring coupled to the magnetic element.

9. The apparatus of claim 1, further comprising at least one auxiliary magnet positioned along the fixed support, the at least one auxiliary magnet configured to repel a closer end of the magnetic element within the fixed support.

10. The apparatus of claim 1, the fixed support comprising a tube, the magnetic element provided within the interior of the tube for movement along a longitudinal axis of the tube.

11. An apparatus comprising:
   a chassis;
   a fixed support coupled to the chassis, the support having a first axis;
   a magnetic element movable relative to the support along the first axis;
   at least one conducting coil surrounding the first axis; and
   means for generating a current in the at least one conducting coil according to a current profile, the current profile designed to move the magnetic element along the first axis such that, over at least one cycle, the maximum acceleration of the magnetic element in one direction along the first axis is greater than the maximum acceleration of the magnetic element in the other direction along the first axis.

12. The apparatus of claim 11, further comprising a handheld device, the chassis forming a chassis of the handheld device.

13. The apparatus of claim 12, the handheld device comprising a mobile phone.

14. The apparatus of claim 12, the handheld device comprising a personal navigation device.

15. The apparatus of claim 11, the at least one conducting coil comprising a plurality of coils, the means for generating a current configured to separately generate current profiles for each of the plurality of coils to move the magnetic element along the first axis.

16. The apparatus of claim 11, the means for generating a current further comprising an active current generation block comprising:
   means for generating a magnitude and sign of a current desired to be present in the at least one coil; and
   means for converting the output of the means for generating a magnitude and sign to an analog current.

17. The apparatus of claim 11, the current control block comprising:
   means for generating the current profile;
   means for harvesting energy from a current present in the at least one coil to charge a rechargeable energy source; and
   means for selectively coupling the at least one coil to the means for generating the current profile and the means for harvesting energy.

18. The apparatus of claim 11, further comprising at least one spring, a first end of the at least one spring fixedly coupled to the fixed support, a second end of the spring coupled to the magnetic element.

19. The apparatus of claim 11, further comprising at least one auxiliary magnet positioned along the fixed support, the at least one auxiliary magnet configured to repel a closer end of the magnetic element within the fixed support.

20. The apparatus of claim 11, the fixed support comprising a tube, the magnetic element provided within the interior of the tube for movement along a longitudinal axis of the tube.

* * * * *